Figure 1:
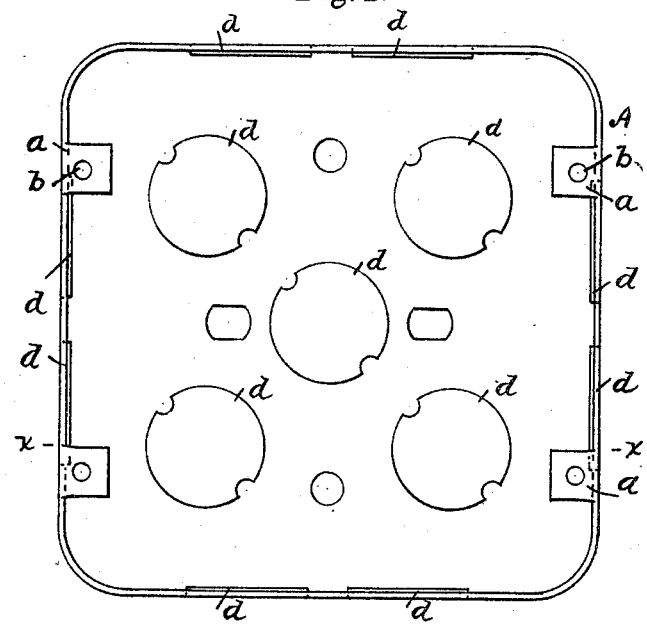

No. 682,233. Patented Sept. 10, 1901.
W. F. BOSSERT.
OUTLET BOX FOR INTERIOR CONDUITS.
(Application filed July 20, 1901.)
(No Model.)

WITNESSES:
James Lynch
V. M. Berthold

INVENTOR.
William F. Bossert
BY
Geo. Willis Pierce
ATTORNEY.

THE NORRIS PETERS CO., PHOTO-LITHO., WASHINGTON, D. C.

UNITED STATES PATENT OFFICE.

WILLIAM F. BOSSERT, OF UTICA, NEW YORK, ASSIGNOR TO THE BOSSERT ELECTRIC CONSTRUCTION COMPANY, OF SAME PLACE.

OUTLET-BOX FOR INTERIOR CONDUITS.

SPECIFICATION forming part of Letters Patent No. 682,233, dated September 10, 1901.

Application filed July 20, 1901. Serial No. 68,996. (No model.)

*To all whom it may concern:*

Be it known that I, WILLIAM F. BOSSERT, residing at Utica, in the county of Oneida and State of New York, have invented certain Improvements in Outlet-Boxes for Interior Conduits, of which the following is a specification.

The present invention relates to wall or outlet boxes employed with electric conduit systems with which modern buildings are equipped, by means of which electric-power conductors are safely conveyed to all points in a building and their terminals brought out at suitable localities into the said outlet-boxes where connections are made as desired.

My invention is an improvement upon the box described in Patent No. 511,297, granted to me November 10, 1896. The said patent refers to an outlet-box struck up from sheet metal into the desired form and has holes punched in its walls of a size suitable to receive the ends of the conduits, which are secured to the wall of the box in any suitable manner. For commercial purposes it is desirable to have the holes made in the walls of the boxes when furnished to the trade. At the same time it is an inconvenience to leave the holes open, as it is not known how many conduits will enter a box or in what wall they will enter, and it is also preferable that only the holes in which conduits are to be connected shall remain open, for the box should be closed on all sides when once placed in the wall. In the patent referred to, which so far as I am aware of is the first to describe a sheet-metal box struck up into shape, the plugs or blanks which are punched from the walls are reinserted therein and are adapted to wedge themselves into the holes, so that they are not readily removed and will remain in place until forced out by some appropriate tool, and this method of closing the holes once made by disks, plugs, or blanks held in place frictionally I believe to be my invention and to be claimed in said patent.

In the present invention I provide a sheet-metal box in much the same way as described in said patent with a suitable cover; but when the holes are punched the disks, plugs, or blanks are not fully forced through the wall of the box, but are pushed far enough to cut the fiber of the iron and effect a clearage, and yet not so far as to loosen them from the wall, so that they remain wedged into the wall and can be detached therefrom by a sharp blow from a hammer.

The invention also consists in the method of simultaneously punching portions of the walls and displacing the punched portions a distance less than the thickness of the walls, and also in the indenting or interlocking peripheries of the punched or offset portions and the contiguous walls of the box, all of which I will now proceed to describe and point out in the appended claims.

Figure 2:
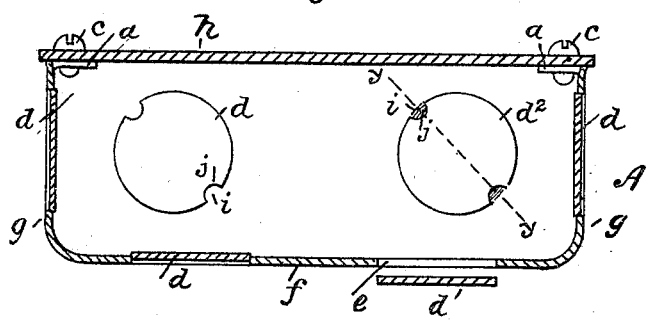
Figure 4:
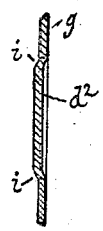
Figure 3:
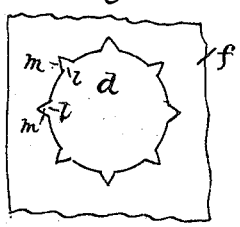

Figure 1 of the drawings is a plan view of my improved outlet-box with the cover removed; and Fig. 2 is a section on line $xx$ of Fig. 1, showing the cover secured to the box. Figs. 3 and 4 represent two modifications of the invention.

A represents the box as a whole, which is formed from a piece of ductile sheet metal by means of dies in the usual manner of pressing up articles of this character and is provided with lugs $a$, which have screw-threaded holes $b$, adapted to receive the screws $c$ when the cover $h$ is secured to the box. After the box has been pressed up the side and bottom walls $g$ and $f$ thereof are successively placed upon the anvil of a power punching-machine and the punching-tool permitted to press down upon them at suitable places upon the walls to a predetermined distance and force the "disks," "plugs," or "blanks," as the portion to be punched may be called, partly from the walls, say, one-half or two-thirds the thickness of the said walls, so that the metal is completely cut, but not pressed out from the walls. The blanks are thus left in the holes and tightly wedged therein and held by frictional pressure. The disks, plugs, or blanks are preferably made with one or more notches $j$ in their peripheries and corresponding projecting ears $i$ in the walls of the box to further insure the retention of the disks in the said walls as the peripheries of the disks are thus further increased, thus adding to the adhesion or frictional surface, and at the same time the indenting-notches and ears prevent the rotation of the disks.

The blanks are preferably punched from the outside toward the inside of the box, as when offset from the inside toward the outside they form internal projections and are liable to become accidentally detached, while if offset inwardly they remain safely in position during transportation and all handling. When a box is to be placed in position in a wall and the conduit-entrances are determined, the plugs or portions *d* to be forced out are completely detached by a sharp blow from a hammer or other implement.

In the modification shown in Fig. 3 the "ears" *i* are formed in the blank and are shown to be triangular in shape and form indenting or interlocking peripheries with the wall portions *m* of the box.

In Fig. 4, which is a section on *y y* of Fig. 2, the ears *i i* are not cut with the rest of the circle, but are bent inward and hold the disk very slightly when the fiber has been severed at the remaining parts of the circle.

I claim as my invention—

1. A metal outlet-box, having one or more partially-formed openings in its walls, each opening being circular and having one or more ears projecting into notches in the periphery of the blanks closing said openings.

2. A metal outlet-box, having one or more partially-formed openings in its walls, each opening being circular in configuration, the peripheries of the openings and of their partly-expelled blanks being mutually indented, as set forth.

3. The improvement in the method of making metal outlet-boxes which consists in simultaneously punching portions of the walls of a sheet-metal outlet-box and displacing the punched portions a distance less than the thickness of the walls, as herein described.

In testimony whereof I have signed my name to this specification, in the presence of two subscribing witnesses, this 6th day of July, 1901.

WILLIAM F. BOSSERT.

Witnesses:
FRANK G. SCOFIELD,
FRED T. FOXENBERGER.